United States Patent
Tanaka

(10) Patent No.: US 9,815,430 B2
(45) Date of Patent: Nov. 14, 2017

(54) SEWN AIRBAG AND METHOD FOR PRODUCING THE SAME

(71) Applicant: TOYODA GOSEI CO., LTD., Kiyosu-shi, Aichi-ken (JP)

(72) Inventor: Koki Tanaka, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/849,667

(22) Filed: Sep. 10, 2015

(65) Prior Publication Data

US 2016/0090059 A1    Mar. 31, 2016

(30) Foreign Application Priority Data

Sep. 30, 2014   (JP) ................................ 2014-201380

(51) Int. Cl.
  *B60R 21/235*   (2006.01)

(52) U.S. Cl.
  CPC .... *B60R 21/235* (2013.01); *B60R 2021/2358* (2013.01); *B60R 2021/23514* (2013.01); *B60R 2021/23538* (2013.01); *B60R 2021/23576* (2013.01)

(58) Field of Classification Search
  CPC  B60R 2021/23514; B60R 2021/23538; B60R 2021/23576; B60R 2021/2358; B60R 21/235
  See application file for complete search history.

(56) References Cited

U.S. PATENT DOCUMENTS

| | | | |
|---|---|---|---|
| 5,356,680 A * | 10/1994 | Krummheuer | B60R 21/235 139/389 |
| 6,283,507 B1 * | 9/2001 | Kami | B60R 21/233 139/389 |
| 6,764,762 B2 * | 7/2004 | Seemuth | D06M 7/00 428/364 |
| 7,517,570 B1 * | 4/2009 | Li | B60R 21/235 280/728.1 |
| 8,261,779 B2 * | 9/2012 | Horiguchi | D01D 5/092 139/383 R |

(Continued)

FOREIGN PATENT DOCUMENTS

| JP | 04-081342 A | 3/1992 |
|---|---|---|
| JP | 04-197848 A | 7/1992 |

(Continued)

OTHER PUBLICATIONS

Japanese Platform for Patent Information, Machine English Translation of JP 2009-227017A, retrieved on Apr. 25, 2017.

(Continued)

*Primary Examiner* — Arti Singh-Pandey
(74) *Attorney, Agent, or Firm* — Posz Law Group, PLC

(57) ABSTRACT

A sewn airbag includes a plurality of base fabrics sewn together, wherein in a sewn region where reinforcement is required, a reinforcing coating film made of an adhesive coating material that is adhesive to both a sewing yarn and fibers forming the base fabrics is formed on at least one of the upper and lower surfaces of the sewn region, the reinforcing coating film having the smallest possible width along a stitching region in the form of one or more strips forming the sewn region made with the sewing yarn.

9 Claims, 7 Drawing Sheets

(56) References Cited

U.S. PATENT DOCUMENTS

| | | | |
|---|---|---|---|
| 2002/0020992 A1* | 2/2002 | Kanuma | B60R 21/232 280/730.2 |
| 2004/0036262 A1* | 2/2004 | Kanuma | B60R 21/231 280/739 |
| 2006/0110995 A1* | 5/2006 | Ternon | D04B 21/14 442/59 |
| 2007/0031621 A1* | 2/2007 | Morimoto | B60R 21/235 428/36.1 |
| 2007/0184733 A1* | 8/2007 | Manley | B60R 21/235 442/59 |
| 2007/0262575 A1* | 11/2007 | Kobayashi | B60R 21/235 280/743.1 |
| 2009/0247030 A1* | 10/2009 | Kano | B60R 21/235 442/104 |
| 2015/0336530 A1* | 11/2015 | Tanaka | B60R 21/235 280/728.1 |

FOREIGN PATENT DOCUMENTS

| | | | | |
|---|---|---|---|---|
| JP | 05-238342 A | 9/1993 | | |
| JP | 2000-007642 A | 1/2000 | | |
| JP | 2001-279089 A | 10/2001 | | |
| JP | 2002-145001 A | 5/2002 | | |
| JP | 2005-138704 A | 6/2005 | | |
| JP | 2008-111222 A | 5/2008 | | |
| JP | 2009-062643 A | 3/2009 | | |
| JP | 2009062643 | * 3/2009 | | D06M 15/564 |
| JP | 2009-227017 A | 10/2009 | | |
| JP | 2009227017 | * 10/2009 | | B60R 21/16 |
| JP | 2010-234909 A | 10/2010 | | |
| JP | 2010-241417 A | 10/2010 | | |
| JP | 2010234909 | * 10/2010 | | B60R 21/20 |
| JP | 2011-132374 A | 7/2011 | | |
| JP | 2011-168131 A | 9/2011 | | |
| JP | 2013-510769 T | 3/2013 | | |
| JP | 2014-070128 A | 4/2014 | | |
| WO | 2011/060245 A1 | 5/2011 | | |
| WO | 2015/048705 A1 | 4/2015 | | |

OTHER PUBLICATIONS

Office Action dated Aug. 1, 2017 issued in corresponding JP patent application No. 2014-201380 (and English translation).

* cited by examiner

11

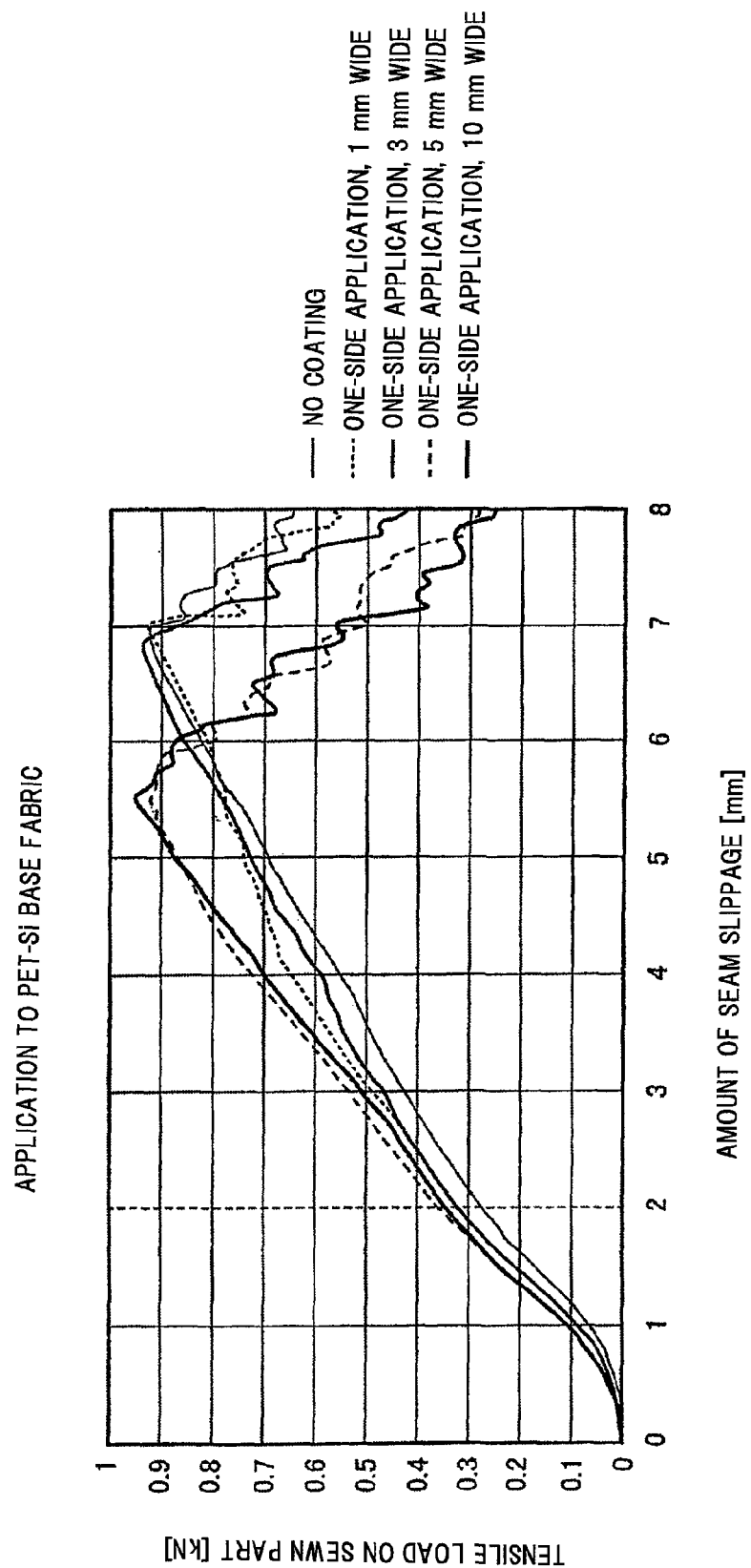

US 9,815,430 B2

SEWN AIRBAG AND METHOD FOR PRODUCING THE SAME

CROSS-REFERENCE TO RELATED APPLICATION(S)

This application is based upon and claims the benefit of priority from Japanese Patent Application No. 2014-201380, filed on Sep. 30, 2014, the entire contents of which are incorporated herein by reference.

BACKGROUND

1. Field of the Invention

The present invention relates to a sewn airbag and also to a method for producing the same. It particularly relates to an invention suitable for reinforcement in a region of a sewn airbag where reinforcement is required (e.g., a peripheral sewn region of an airbag made of an outer panel and an inner panel sewn together).

In the following description, airbags for knee protection or side impact will be mainly described as examples. The invention is not particularly limited as long as it is a sewn airbag having a sewn region, and can be applied to airbags for the driver seat, front passenger seat, etc.

In the specification of the present application, a cover factor (hereinafter sometimes abbreviated to "CF") is determined by the following equation (1).

$$CF = NW \times DW^{0.5} + NF \times DF^{0.5} \qquad (1)$$

wherein

NW: warp density (the number of yarns/inch), DW: warp fineness (dtex)

NF: weft density (the number of yarns/inch), DF: weft fineness (dtex)

"Part" that indicates a unit of blending, etc., is by mass unless otherwise noted.

2. Description of the Related Art

In automobiles, airbag devices for passenger protection are mounted. As airbag base fabrics to be incorporated into an airbag device, cloths formed by weaving (e.g., plain-weaving) fiber yarns (e.g., polyamide fibers, polyester fibers) are used.

The purpose of an airbag is to protect the passengers of the automobile. As the basic performance, an airbag is required to have air-blocking performance (low breathability) so that it can inflate instantly and retain the air pressure for a sufficient period of time.

Then, in the case of an airbag for knee protection or side impact, the volume for inflation is low, and the gas pressure tends to be high upon the operation of the inflator. Therefore, for such airbags, in order to ensure pressure resistance, a high-density coated base fabric having high CF has been used, or a reinforcing fabric has been sewn together with a sewn region that is likely to receive pressure, for example.

However, recently, also for such airbags for knee protection or side impact, the development of a sewn airbag with more simple reinforcement, which leads to the further reduction of airbag weight or resource saving, and also leads to the reduction of man-hours, has been desired.

In order to meet these demands, JP-A-2005-138704 proposes a technique of using base fabrics having relatively small CF and also using a thick yarn as a sewing yarn (e.g., yarn count of 20 (600 dtex) or more) to reinforce the sewn region (to increase pressure resistance).

However, in this technique, because a thick yarn is used as a sewing yarn, outgassing often happens at the seam. In order to prevent outgassing, JP-A-2005-138704 further describes, in paragraph 0018, that an anti-outgassing material is given to the sewn region. In the paragraph, it is described that in order to prevent outgassing, on the upper surface and/or lower surface of a peripheral sewn region, 1) various seal materials, adhesive materials, and pressure-sensitive adhesive materials, such as silicone-based, polyurethane-based, epoxy-based, acrylic-based, vinyl-based, and halogen-containing resins and rubbers, are applied, sprayed, or laminated, 2) an adhesive cloth, a pressure-sensitive adhesive cloth, or the like is attached, or 3) a main base fabric and a separate protection cloth are placed on top of each other and sewn together.

The anti-outgassing material described therein has a possibility of sewn region reinforcement. However, unlike the invention of the present application (as will be described later), it is not intended to increase the slippage resistance of the base fabrics forming the airbag body to reinforce the sewn region.

In addition, in the case of 1), it is likely that a relatively large amount of seal material or the like is necessary to prevent outgassing from the seam. The application of a large amount of seal material to a sewn region does not lead to resource saving or airbag weight reduction, and also adversely affects the folding properties of the airbag.

In addition, when an anti-outgassing material is given to a sewn region, not just in the cases of 2) and 3), but also in the case of 1) where an anti-outgassing material is applied, etc., the application step is not intended to be performed synchronously with a sewing step and a prevention material curing step. Accordingly, this does not lead to the reduction of production man-hours.

Further, JP-A-2010-241417 discloses the following invention: in a curtain airbag, a bead made of a seal material or the like is formed along the high-pressure side of the first seam portion toward or facing the flowing gas, thereby reinforcing the seam portion (paragraph 0015). However, the bead is not directly applied and formed onto the first seam, but is applied and formed along the high-pressure side. Thus, a coating film is not directly formed on a sewn region like the present invention.

JP-A-2010-234909 discloses the following invention: in order to improve the airtightness of the joining portion of a curtain airbag, an adhesive is applied along the inner joining portion of a sewn region of the curtain airbag, then a non-application part is formed, and the non-application part is sewn (Abstract, etc.). However, the adhesive is applied to a region to be sewn inside between the facing surfaces of base fabrics before sewing. Thus, it is not formed outside a sewn region after sewing like the present invention.

SUMMARY

In light of the above, an object of the invention is to provide a sewn airbag with more simple reinforcement, which leads to the further reduction of airbag weight or resource saving, and also leads to the reduction of man-hours; and also a method for producing the same.

According to an aspect of the invention, there is provided a sewn airbag including a plurality of base fabrics sewn together, wherein in a sewn region where reinforcement is required, a reinforcing coating film made of an adhesive coating material that is adhesive to both a sewing yarn and fibers forming the base fabrics is formed on at least one of the upper and lower surfaces of the sewn region, the reinforcing coating film having the smallest possible width along a stitching region in the form of one or more strips forming the sewn region made with the sewing yarn.

According to another aspect of the invention, there is provided a method for producing the sewn airbag including: sewing the base fabrics together; applying adhesive coating material to a stitching region formed by the sewing; and heating and curing a coating film formed by the coating to form a reinforcing coating film, wherein the sewing, the applying and the heating and curing are performed synchronously and continuously.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIGS. 6A and 6B are graphs showing the test results of Test Example 3 performed on different base fabrics to determine the appropriate value of reinforcing coating film width.

DETAILED DESCRIPTION OF THE INVENTION

Figure 1:
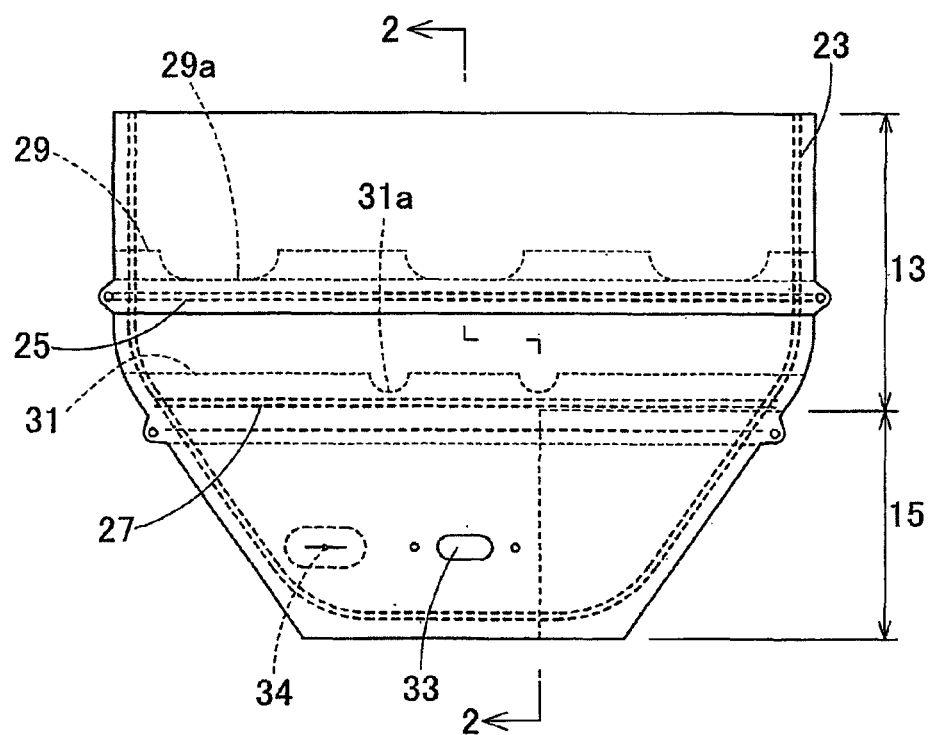
FIG. 1 is a rear view showing an airbag for knee protection as an example of an airbag to which the invention can be applied.
Figure 2:
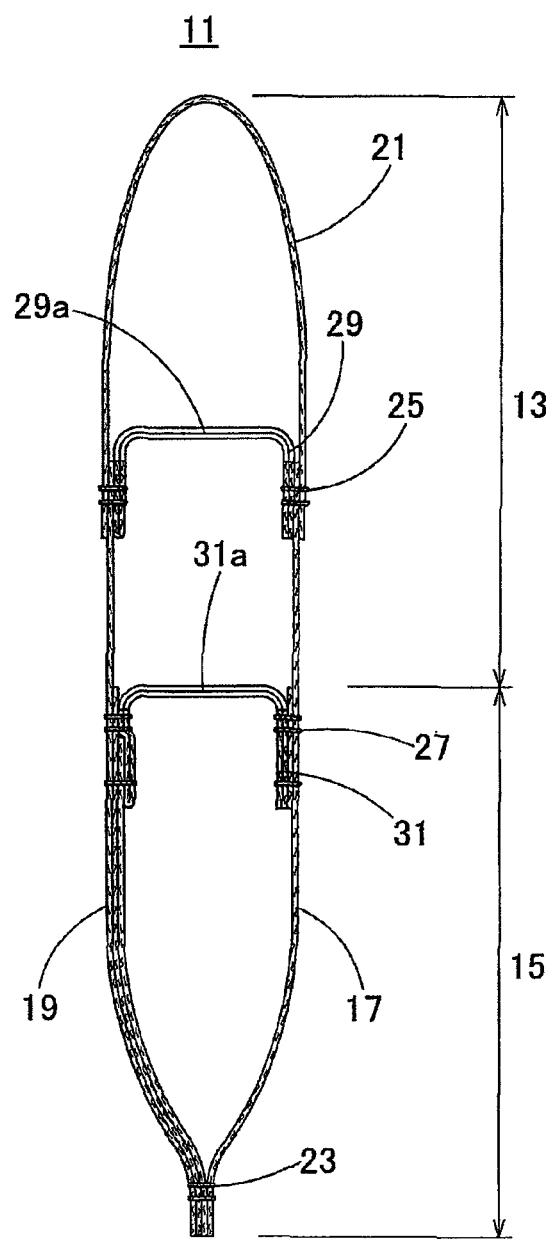
FIG. 2 is an enlarged cross-sectional view of FIG. 1 along the line 2-2.

An example of an airbag for knee protection to which the invention can be applied will be described based on FIGS. 1 and 2.

As illustrated, the airbag 11 basically includes a knee protection part 13 and an installation part 15. The installation part 15 is formed of the lower parts of a front base fabric 17 and a back base fabric 19. In addition, the knee protection part 13 is formed of a folded base fabric 21 and the upper parts of the front base fabric 17 and the back base fabric 19.

A peripheral sewn part 23 is formed upon the formation of a bag body from the front base fabric 17, the back base fabric 19, and the folded base fabric 21. In addition, upper and lower intermediate sewn parts 25 and 27 are formed when an upper tether 29 and a lower tether 31, which are each a strip-like base fabric, are sewn together with a reinforcing fabric, etc., upon the formation of a bag body.

Incidentally, the back base fabric 19 of the installation part 15 has formed therein a bolt hole 33 for the installation of an inflator and a slit hole 34 for the insertion of a retainer/inflator. In addition, the upper and lower tethers 29 and 31 include gas flow holes 29a and 31a for the flow of the inflation gas.

Airbag base fabrics herein are not particularly limited. Usually, those made of polyamide (PA) fiber or polyester fiber filaments, which are often used, are used.

Examples of the PA fibers used include aliphatic polyamides such as such as Nylon 66, Nylon 6, Nylon 46, and Nylon 12; and aromatic polyamides such as aramids.

Examples of the polyester fibers usually used include PET (polyethylene terephthalate).

The weaving mode of the base fabric (cloth) is usually plain weave, but may also be twill weave or satin weave.

In addition, the base fabric dost not have to be coatless and may be single-coated. As a coating agent therefor, it is possible to use silicone, urethane, CR rubber, etc.

In addition, the cover factor (CF) of the base fabric (cloth) represented by the above equation (1) is usually not particularly limited as long as the low breathability required for the airbag can be ensured together with bending resistance that allows for folding, etc. For example, the CF is 1000 to 2700, preferably 1500 to 2500. The use of a cloth having low CF, that is, high breathability, allows for the reduction of airbag weight and also for cost reduction. When the CF is too low, it becomes difficult to provide the base fabric with the predetermined mechanical strength especially in the case where the fabric is coatless, and also it becomes difficult to ensure the low breathability required for the airbag.

When the yarn density and/or fineness is high, the rigidity of the base fabric is less likely to be within predetermined values. Further, in the case where the yarn density is high, the cloth is thick, which is likely to cause problems in the folding/storing properties of the airbag.

In addition, as a sewing yarn, as in the case of base fabrics, a yarn made of a polyamide fiber or a polyester fiber is usually used. The thickness of the sewing yarn is 400 to 2600 dtex, preferably 1200 to 1900 dtex. When the sewing yarn is thin, it is difficult to ensure sewing strength. On the other hand, when the sewing yarn is thick, problems are likely to occur during machine sewing for the package upload or airbag production; for example, the sewing-machine needle breaks, the sewing machine stops, etc. The number of stitches in the stitching region at that time is 2 to 5 stitches/cm. In addition, in the case where the stitching region is in the form of a plurality of strips, the distance between stitching region strips is 2.5 to 10 mm.

Figure 3:
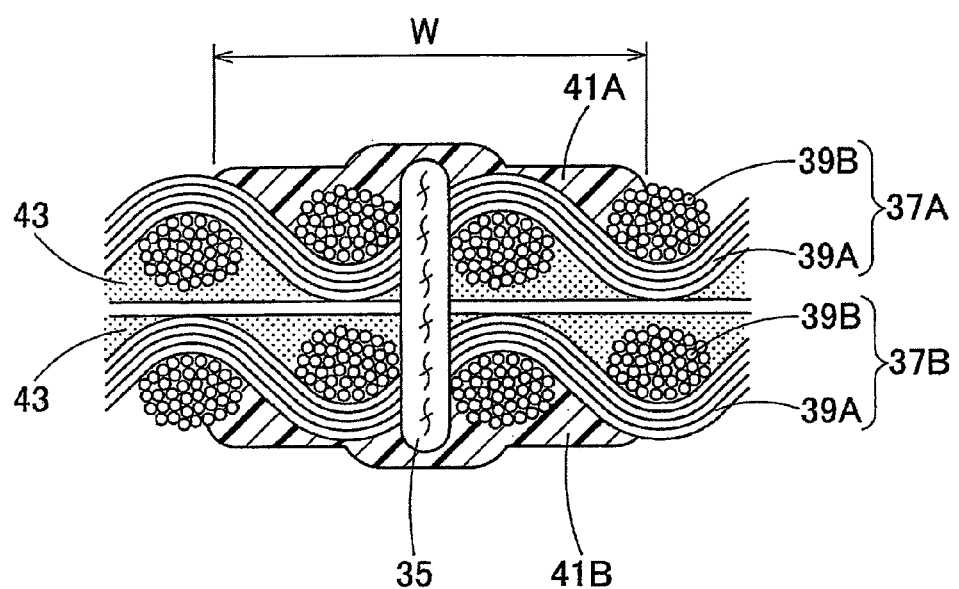
FIG. 3 is an enlarged model cross-sectional view of an important part of a base fabric according to one embodiment of the invention.

In the airbag 11, in this embodiment, as shown in FIG. 3, a reinforcing coating film 41 made of an adhesive coating material that is adhesive to both of the sewing yarn 35 and fibers forming the upper and lower base fabrics 37A and 37B (warp 39A and weft 39B) is formed in the sewn region where reinforcement is required. The reinforcing coating films 41A and 41B are usually applied to the outer surfaces of the upper and lower base fabrics 37A and 37B, respectively, that is, both sides of the sewn region. Application to only one side of the sewn region also has some reinforcing effect. Incidentally, in the illustrated example, the base fabrics 37A and 37B both have a coating 43.

At this time, with respect to the coating film width w, as long as the coating film has a reinforcing effect, it should have the smallest possible width along the stitching region in the form of one or more strips forming the sewn region.

In the case where the application stitching region is in the form of a plurality of strips, the coating film is configured as one wide strip that can be applied at once. In addition, in the case where the distance between the stitching region strips is wide (e.g., 3 mm or more), it may also be configured such that the same number of coating film strips as the number of stitching region strips are spaced apart from each other.

As the adhesive coating material, a material that is adhesive (has wettability) to both of the base fabrics 37A and 37B and the sewing yarn 35 is used. In addition, with respect to the form of the adhesive coating material, in terms of handleability, environmental problems, etc., a solvent-free emulsion is preferable.

The base resin in the emulsion coating material is not particularly limited as long as it is adhesive (has wettability) to both of the base fabrics and the sewing yarn as mentioned above. In the case where the base fabrics are PET or PA, examples thereof include PA (nylon)-based, ester-based, urethane-based, and epoxy-based resins (polymers).

Among them, in terms of the durability of the coating film, aqueous polyether-modified urethanes and carbonate-modified urethanes having hydrolysis resistance are preferable. In particular, in terms of the increasing effect on slippage resistance, hydrolysis resistance, and also productivity, carbonate-modified urethanes having added thereto a crosslinking agent (with short curing time) are preferable.

Carbonate-modified urethanes herein are polyurethanes having or made mainly of a polycarbonate chain. Incidentally, when simply referred to as "modified urethane" in the following description, unless otherwise noted, other modified urethanes are not included.

In addition to a polycarbonate chain, other functional groups may also be present. In terms of the durability of the coating film, it is preferable that such other functional groups also have hydrolysis resistance.

In addition, usually, in terms of ensuring the pot life of the coating material, as such modified urethanes, it is preferable to use those having terminal $COO^-$ capped with amines, such as triethylamine.

As the modified urethanes, for example, it is preferable to use those described in JP-A-2001-279089. The following is a quote from the patent publication, paragraphs 0008 to 0012, with editorial corrections.

"The urethane-modified urethane (emulsion) having a polycarbonate chain in the molecule of this invention can be produced by a known method. That is, specifically, the production may be such that, for example, a polyol having a polycarbonate chain (hereinafter referred to as polycarbonate polyol) and a diisocyanate are allowed to react in a solvent, followed by emulsification.

Because the molecular weights of a diisocyanate and a polycarbonate polyol are increased in advance, and also a water dispersion that has already lost reactivity with diisocyanates is applied, there is no need for aging for the formation of a practical film, there is absolutely no variation in quality, and productivity can be improved.

Examples of polycarbonate polyols include compounds resulting from the reaction between a glycol, such as 1,4-butanediol, 1,6-hexanediol, or diethylene glycol, and diphenyl carbonate or phosgene. They may be used alone, and it is also possible to use a combination of two or more kinds.

Examples of diisocyanates include 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3-cyclohexylene diisocyanate, 1,4-cyclohexylene diisocyanate, xylylene diisocyanate, tetramethylenexylylene diisocyanate, hydrogenated xylylene diisocyanate, lysine diisocyanate, isophorone diisocyanate, 4,4'-dicyclohexylmethane diisocyanate, and 3,3'-dimethyl-4,4'-dicyclohexylmethane diisocyanate. They may be used alone, and it is also possible to use a combination of two or more kinds.

Among these diisocyanates, in terms of stability, light resistance, etc., aliphatic diisocyanates are preferable. As aliphatic diisocyanates, among the above diisocyanates, those that are aliphatic diisocyanates can be used as they are".

In addition, as a modified urethane, a commercially available product in emulsion form can be usually used. For example, it is preferable to use "HYDRAN WLS210" and "HYDRAN WLS213" (both registered trademarks) manufactured by DIC Corporation and "UA-368T" (trade name, modified urethane series) manufactured by Sanyo Chemical Industries.

In addition, the crosslinking agent mentioned above is not limited as long as it is capable of a condensation reaction with $COO^-$. Examples thereof include oxazoline and glycols, amino alcohols, and diamines terminated at each end with a hydroxyl group or an amino group.

Among them, the carbodiimide compound (glycol) having a carbodiimide group described in JP-A-2011-132374, which is end-capped with at least one compound selected from amino alcohols, dialkylamino alcohols, and (poly) alkylene glycol monoalkyl ethers (hydrophilic organic compound I) and a compound that is more hydrophilic than the hydrophilic organic compound I and has at least one hydroxyl group, is preferable. Incidentally, it is also possible to use the dicyclohexylmethane dicarbodiamide described in JP-A-2000-7642, which is a both-terminal adduct of a polyalkylene(ethylene)oxide end-capped with alkoxy groups.

This is because in the case where these carbodiimide compounds are employed as crosslinking agents, the resulting coating film has excellent durability (abrasion resistance, hydrolysis resistance, and reactivity).

The following is a quote from JP-A-2011-132374, paragraphs 0014 to 0015, with editorial corrections.

"The resin crosslinking agent of this invention contains a carbodiimide compound having at least one carbodiimide group and an aqueous liquid compound. The carbodiimide compound is end-capped with at least one compound selected from dialkylamino alcohols, hydroxycarboxylic acid alkyl esters, and (poly)alkylene glycol monoalkyl ethers (hydrophilic organic compound I) and a compound that is more hydrophilic than the hydrophilic organic compound I and has at least one hydroxyl group. Incidentally, in this specification, said at least one compound selected from dialkylamino alcohols, hydroxycarboxylic acid alkyl esters, and (poly)alkylene glycol monoalkyl ethers is sometimes referred to as "hydrophilic organic compound I." It is preferable that the carbodiimide compound for use in the invention is a carbodiimide compound having a terminal isocyanate capped with a mixture of the hydrophilic organic compound I and the organic compound that is more hydrophilic than the hydrophilic organic compound I."

These crosslinking agents may be commercially available products. Examples thereof include the "CARBODILITE" (registered trademark) series manufactured by Nissin Chemical Corporation. Among them, in terms of productivity, it is preferable to use those with high reactivity (short curing time), such as "CARBODILITE V-02-L2".

Incidentally, the crosslinking agent is added in an amount of, on solid basis, 0.1 to 10 parts (preferably 1 to 5 parts) per 100 parts of the modified urethane. When the amount of crosslinking agent is too small, it is difficult to ensure adhesiveness to the sewing yarn and base fabrics, while when it is too large, the resulting coating film is hard, and the base fabrics lose flexibility.

The adhesive coating material to be applied to a sewn region in the invention also suitably contains supplementary materials, such as a defoaming agent, a thickening agent, and the like in terms of coating properties, a coloring agent and the like in terms of the appearance of the reinforcing coating film, etc.

Next, the following will describe the method for producing a sewn airbag using the above coating material.

The method according to the invention basically includes the following three steps: (1) a base fabric sewing step of sewing base fabrics together, (2) a coating step of applying the adhesive coating material to the sewn (stitching) region, and (3) a curing step of heating and curing the coating film formed in the coating step to form a reinforcing coating film.

(1) Base Fabric Sewing Step:

Non-coated base fabrics or single-coated base fabrics cut from a woven cloth made of a PA fiber or a polyester fiber are prepared, and the base fabrics are sewn together using a sewing yarn under the above conditions into an airbag.

(2) Coating Step:

The modified urethane mentioned above is applied to a region of the produced airbag to be reinforced, such as the peripheral sewn region.

As a coating method, a one-side application method capable of controlling the coating film width is employed. Examples thereof include knife coating (die coating), roll coating (national, reverse), brush coating, spray coating, kiss-roll coating, and flow coating (shower coating, curtain coating). At this time, in terms of productivity, knife coating (die coating), roll coating (national, reverse), and brush coating, which allow for one-side application to the outer surfaces of upper and lower base fabrics of the sewn region at once, are preferable.

The coating weight at this time (on solid basis) depends on the composition of the coating material and the characteristics required for the base fabrics (breathability, flexibility), and is usually 3 to 80 $g/m^2$, preferably 6 to 60 $g/m^2$, and still more preferably 8 to 40 $g/m^2$.

The coating weight at this time is adjusted by the gap between coated surfaces or the supply of coating material per unit time.

Figure 5:
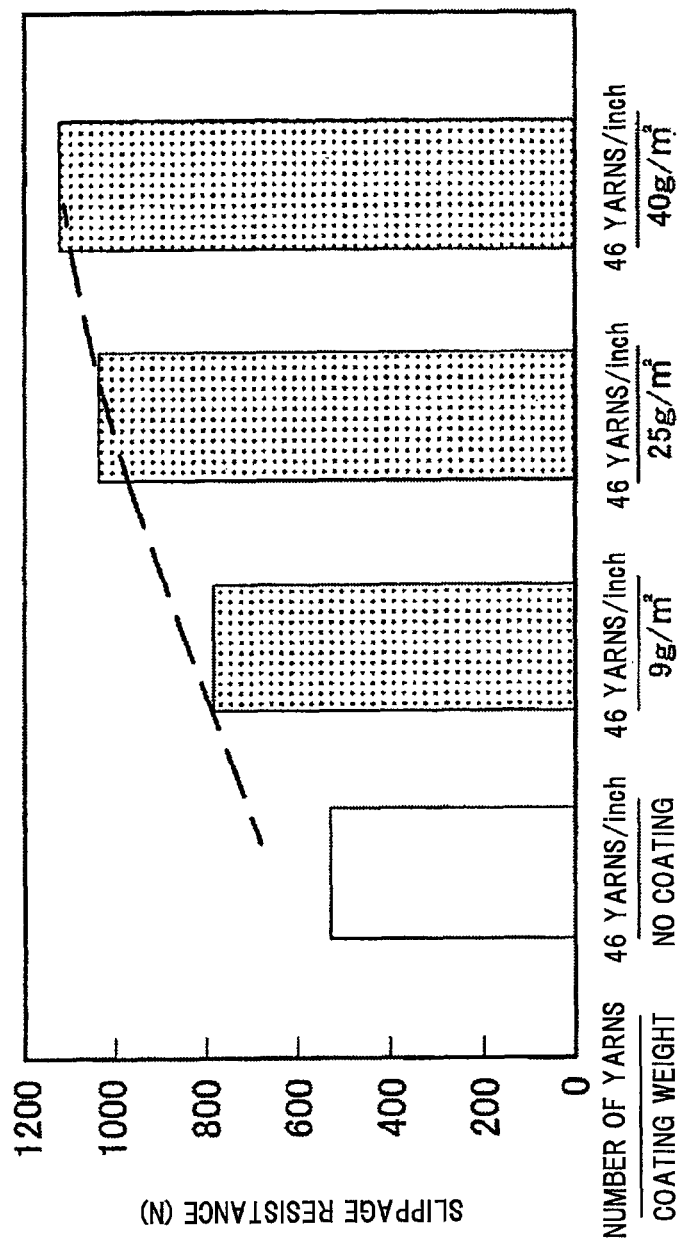
FIG. 5 is a histogram showing the results of Test Example 2 that determines the relation between coating weight and slippage resistance to determine the appropriate value of coating weight.

The above coating weight range has been induced from FIG. 5 showing the test results of Test Example 2 that determines the relation between coating weight and slippage resistance.

In addition, in terms of the reinforcing effect based on the increase in slippage resistance and the resulting seam-slippage-suppressing effect, it is preferable that the coating film width of the reinforcing coating film along the stitching region is set to be 0.5 mm or more, more preferably 4 mm or more, on one side. In addition, in terms of application operability, the width is preferably 3 mm or more on one side. In terms of the saturation of the increasing effect and also in terms of resource saving, the upper limit of the coating film width is usually 15 mm or less on one side.

In addition, in terms of productivity, resource saving, etc., it is preferable that the reinforcing coating film has the smallest possible width.

Figure 6A:
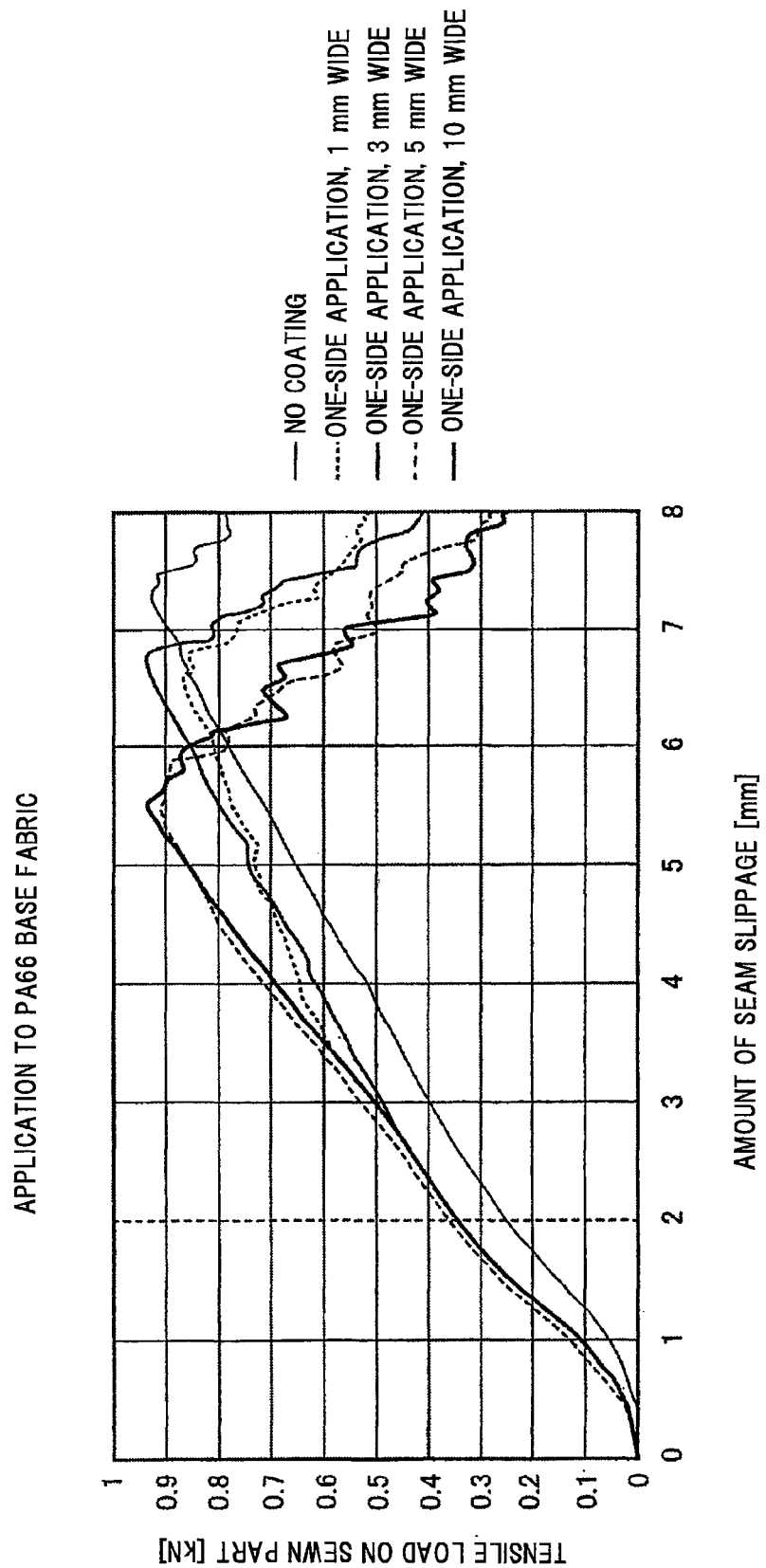

The above application width has been induced from FIGS. 6A and 6B showing the test results of Test Example 3 that determines the relation between tensile strength and the amount of seam slippage at each application width.

Incidentally, in these cases, the surface coating film thickness (dry thickness) on the sewing yarn and the base fabrics varies depending on the combination of the adhesive coating material and the base fabrics/sewing yarn. This is because depending on the sewing yarn and the base fabrics, the permeability of the adhesive coating material thereinto is different. Usually, it is preferable that the surface coating film thickness on the base fabrics is within a range of 0.5 to 100 μm.

For example, in the case of the following combination: adhesive coating material: modified polyurethane, sewing yarn: PA66 filament yarn, base fabrics: PA66, it is preferable that the surface coating film thickness on the sewing yarn is 1 to 50 μm, while the surface coating film thickness on the base fabrics is 10 to 100 μm (see Test Example 1).

In addition, in the case of the following combination: adhesive coating material: modified polyurethane, sewing yarn: PA66 filament yarn, base fabrics: PET-Si, it is preferable that the surface coating film thickness on the sewing yarn is 1 to 10 μm, while the surface coating film thickness on the base fabrics is 1 to 10 μm (see Test Example 1).

(3) Curing Step:

The heating method in the curing step may be ordinary hot-air heating, microwave heating, etc., but is preferably a heating method capable of localized heating, such as infrared radiation (IR). This is because it results in energy saving and also allows the curing step to be performed synchronously with the sewing and application steps.

Incidentally, the heating treatment is performed at a temperature for a period of time such that after the application, the temperature is 10 to 30° C. higher than the temperature at which the capping agent of the modified urethane is released, so that the capping agent can be completely released, and also the water content can be minimized.

When the above three steps are performed synchronously and continuously, the use of the adhesive coating material is reduced, and energy is saved, thereby contributing to resource saving. At the same time, the man-hours are reduced, resulting in an increase in productivity.

The reinforcing coating films (cured coating films) 41A and 41B thus formed are shown in FIG. 3; as illustrated, the formed reinforcing coating films integrally adhere, with predetermined thicknesses, to the base fabrics 37A and 37B made of the warp 39A and the weft 39B and also to the sewing yarn. As a result, the base fabrics have increased slippage resistance, and also seam slippage in the sewn region is also suppressed. Therefore, the expansion of sewing holes is prevented, and also the sewn region is reinforced.

EXAMPLES

The following describes the test examples (Examples) performed to support the advantageous effects of the invention.

<Specification of Sewn Bag>

As the base fabrics (cloth), the following were used.

"PA66": warp, weft: 470 dtex×55 yarns/inch

CF: 2384

"PET-Si": warp, weft: 560 dtex×46 yarns/inch

CF: 2177, one-side silicone application (20 $g/m^2$)

Sewing was performed using a PA66 filament yarn (1850 dtex) as a sewing yarn to form a single strip. The number of stitches was 4/cm.

The basic composition of the adhesive coating material was as follows.

<Basic Composition>

Modified urethane ("HYDRAN WLS-210", solid content: 35%): 100 parts

Crosslinking agent ("CARBODILITE V-02-L2", solid content: 40%): 3 parts

Other additives (defoaming agent, thickening agent, coloring agent): 2 parts

Incidentally, the amount of crosslinking agent relative to the modified urethane is, on solid basis, 3.4 parts per 100 parts of the modified urethane. In addition, the physical properties of the crosslinking agent are as follows: pH: 8 to 11, viscosity: 100 mPa·s, NCN equivalent (the chemical formula weight per mol of carbodiimide groups): 385 (from the homepage of Nisshinbo Chemical Inc.).

<Application/Curing Method>

Application to a sewn region was performed using rolls of various widths used in the description of the test examples in such a manner that the solid coating weights would be as set. Curing was performed using an oven at 120° C.×1 min.

<Test Method>

Slippage Resistance:

(1) From an airbag base fabric (cloth), two rectangular cut fabrics 310 mm in length and 60 mm in width, with a length parallel to the warp being one side, are prepared. The cut fabrics are placed on top of each other and sewn together under the above conditions using a sewing yarn with a seam allowance of about 5 mm from one end. To both sides of the sewn region, each adhesive coating material was applied using each of the rolls described in the following Test Examples 1 and 2 in such a manner that the coating weight would be the set solid coating weight, and the formed coating film was heated and cured under the above conditions to form a reinforcing coating film, thereby giving a sample.

(2) In accordance with ASTM-D6749, approximately the same number of yarns were removed from both sides of the width of the sample to give a specimen, and slippage resistance was measured using the sewn region as a marking line.

Sewing Strength:

(1) From an airbag base fabric (cloth), two rectangular cut fabrics 110 mm in length and 60 mm in width, with a length parallel to the warp being one side, are prepared. The cut fabrics are placed on top of each other and sewn together under the above conditions using a sewing yarn with a seam allowance of about 20 mm from one end. A modified urethane coating material was applied to both sides of the sewn region using a roll described in Test Example 3 to form a reinforcing coating film (3 mm wide on one side) having each coating weight, thereby preparing a sample with the dimension specification shown in FIG. 4.

Figure 4:
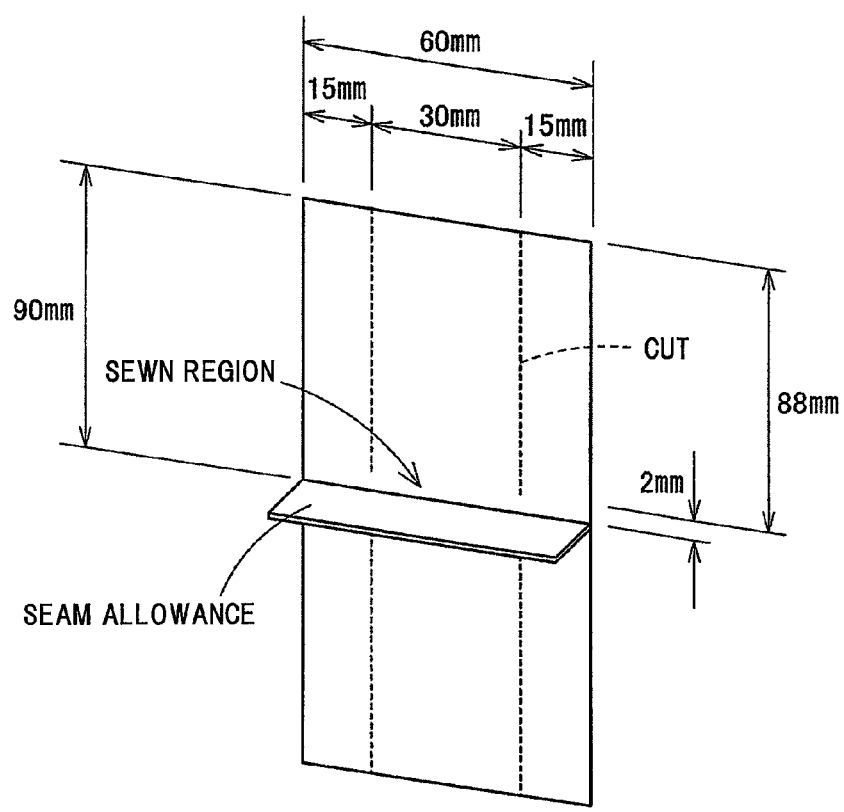
FIG. 4 is a perspective view of a specimen used for the measurement of the sewing strength of a sewn region.

Then, a cut was made as shown in FIG. 4, 30 mm of the central portion was held with a TENSILON tensile tester, and breaking strength was measured at a tensile rate of 200±20 mm. Then, the amount of seam slippage relative to tensile strength was measured.

Test Example 1

Specimens for slippage resistance measurement were prepared using coating materials of the Examples and the following commercially available coating materials, and slippage resistance was measured. Incidentally, for comparison, a base fabric having no reinforcing coating film formed was also subjected to slippage resistance measurement in the same manner.

Using a roll (10 mm wide), each adhesive coating material was applied in such a manner that the solid coating weight would be 50 g/m² on PA66 base fabrics and 30 g/m² on PET-Si base fabrics. The formed coating film was heated and cured under the above conditions to form a reinforcing coating film (5 mm wide on one side), thereby preparing a sample.

With respect to each sample prepared using a modified urethane as a coating material, the reinforcing coating film was observed under a scanning electron microscope (SEM). The observation results are as follows.

Reinforcing coating film on PA66 base fabrics:

Surface coating film thickness on the sewing yarn: 5 to 30 μm, penetrated into the first to second layers;

Coating film thickness on the base fabrics: 30 to 70 μm, penetrated into only the surface layer.

Reinforcing coating film on PET-Si base fabrics:

Surface coating film thickness on the sewing yarn: 3 to 7 μm, penetrated into the first to third layers;

Coating film thickness on the base fabrics: 3 to 7 μm; penetrated into the first layer.

Incidentally, as the commercially available emulsion coating materials, the following were used.

Silicone emulsion: "POLONMF-56" (registered trademark) manufactured by Shin-Etsu Chemical Co., Ltd.

Nylon emulsion: "SEPOLSION NE175" (registered trademark) manufactured by Sumitomo Seika Chemicals Co., Ltd.

Ether-modified urethane emulsion: "UA-200" (product series name) manufactured by Sanyo Chemical Industries Ester emulsion: "PESRESIN 2000" (registered trademark) manufactured by Takamatsu Oil & Fat Co., Ltd.

The measurement results shown in FIG. 5 and Table 1 show the following. Incidentally, in the following description, an increase and a decrease are an increase/decrease in slippage resistance relative to "no coating" (blank) (the same also applies to Test Example 2).

With the Si emulsion, a slight increase is seen in the case of PA66 base fabric, but a decrease is seen in the case of PET-Si base fabric. This is likely to be because the Si emulsion has almost no adhesiveness to both PET and PA66 base fabrics.

In contrast, with the nylon emulsion, although a decrease is seen in the case of PET-Si base fabric, in the case of PA66 base fabric, in combination with the sewing yarn being PA66 (nylon), an increase is seen (1.3 times or more higher than blank). This is presumably because a nylon emulsion does not have excellent adhesiveness to PET-Si base fabrics.

In addition, with the carbonate-modified and ether-modified urethane emulsions and the ester emulsion, an increase is seen both in the cases of PET-Si base fabric and PA66 base fabric. The increasing effect is particularly remarkable with the carbonate-modified urethane emulsion.

These results show that a coating material that is adhesive to both a sewing yarn and base fabrics has a reinforcing effect on the sewn region.

TABLE 1

| Coating material | Base fabrics | |
|---|---|---|
| | PET-si | PA66 |
| Blank | 520N | 590N |
| Carbonate-modified urethane emulsion | 1112N | 1370N |
| Ether-modified urethane emulsion | 894N | 1080N |
| Si emulsion | 426N | 693N |

TABLE 1-continued

| | Base fabrics | |
|---|---|---|
| Coating material | PET-si | PA66 |
| Ester emulsion | 860N | 1370N |
| Nylon emulsion | 421N | 835N |

Test Example 2

For the selection of an appropriate coating weight in a sewn region, this test example determined the relation between the coating weight of a reinforcing coating material and slippage resistance in the Examples with respect to PET-Si base fabrics.

Using a roll (10 mm wide), a modified urethane coating material was applied to PET-Si base fabrics in such a manner that the solid coating weight would be 0, 9, 25, or 40 g/m$^2$, and each formed coating film was heated and cured under the above conditions to form a reinforcing coating film (5 mm wide on one side), thereby preparing a sample.

The following can be induced from the test results shown in FIG. 5.

That is, it is shown that a coating weight of 3 g/m$^2$ still has an increasing effect, but the increase rate starts to gradually decrease at a coating weight of around 40 g/m$^2$, and the reinforcing effect (slippage resistance) stops increasing at 80 g/m$^2$.

Test Example 3

This test example determined the relation between tensile strength and the amount of seam slippage in each of the cases where the base fabrics were PET-Si and PA66, and when the coating material of the Examples was applied to each coating film width.

Using a roll having a width of 2, 6, 10, or 20 mm, the solid coating weights were set as follows; PA66 base fabric: 50 g/m$^2$, PET-Si base fabric: 30 g/m$^2$. The coating film was heated and cured under the above conditions to form a reinforcing coating film (1, 3, 5, or 10 mm wide on one side), thereby preparing a sample.

The following can be induced from the test results shown in FIGS. 6A and 6B.

It can be seen that a coating film width of 0.5 mm on one side has a suppressing effect on seam slippage, but the suppressing effect on seam slippage becomes remarkable when the coating film width is 4 mm or more on one side (particularly within a tensile load range of 0.6 to 0.8 N). Incidentally, 0.8 N is near the breaking strength of the sewing yarn.

This shows that the suppression of seam slippage suppresses the resulting formation of small holes, and also increases the strength of the sewn region.

What is claimed is:

1. A sewn airbag comprising a plurality of base fabrics sewn together, wherein
   in a sewn region where reinforcement is required, a reinforcing coating film made of an adhesive coating material that is adhesive to both a sewing yarn and fibers forming the base fabrics is formed on at least one of the upper and lower surfaces of the sewn region, the reinforcing coating film having the smallest possible width along a stitching region in the form of one or more strips forming the sewn region made with the sewing yarn.

2. The sewn airbag according to claim 1, wherein
   the base fabrics are non-coated base fabrics or single-coated base fabrics.

3. The sewn airbag according to claim 1, wherein
   the adhesive coating material is a urethane-based emulsion coating material.

4. The sewn airbag according to claim 1, wherein
   the adhesive coating material is a carbonate-modified-urethane-based emulsion coating material.

5. The sewn airbag according to claim 4, wherein
   the adhesive coating material further contains a carbodiimide compound as a crosslinking agent.

6. The sewn airbag according to claim 2, wherein
   the reinforcing coating film has a width of 3 mm or more on one side, and the coating weight of the adhesive coating material on solid basis is 3 to 80 g/m$^2$.

7. The sewn airbag according to claim 2, wherein
   the base fabrics have a cover factor (CF) within a range of 1500 to 2500 as determined by the following equation (1):

$$CF = NW \times DW^{0.5} + NF \times DF^{0.5} \quad (1)$$

wherein
NW: warp density (the number of yarns/inch), DW: warp fineness (dtex)
NF: weft density (the number of yarns/inch), DF: weft fineness (dtex).

8. The sewn airbag according to claim 1, wherein
   the slippage resistance of the sewing yarn after the formation of the reinforcing coating film is 1.3 times or more higher than before the formation of the coating film.

9. The sewn airbag according to claim 1, wherein
   the slippage resistance of the sewing yarn after the formation of the reinforcing coating film is 1.5 times or more higher than before the formation of the coating film.

* * * * *